(12) United States Patent
Horton et al.

(10) Patent No.: US 7,065,602 B2
(45) Date of Patent: Jun. 20, 2006

(54) CIRCUIT AND METHOD FOR PIPELINED INSERTION

(75) Inventors: Robert S. Horton, Colchester, VT (US); David W. Milton, Underhill, VT (US); Clarence R. Ogilvie, Huntington, VT (US); Paul M. Schanely, Essex Junction, VT (US); Sebastian T. Ventrone, South Burlington, VT (US)

(73) Assignee: International Business Machines Corporation, Armonk, NY (US)

( * ) Notice: Subject to any disclaimer, the term of this patent is extended or adjusted under 35 U.S.C. 154(b) by 256 days.

(21) Appl. No.: 10/604,205

(22) Filed: Jul. 1, 2003

(65) Prior Publication Data

US 2005/0001280 A1 Jan. 6, 2005

(51) Int. Cl.
*G06F 13/14* (2006.01)
(52) U.S. Cl. ........................... 710/305; 710/105
(58) Field of Classification Search ............ 257/414, 257/426, 428, 431, 438, 461; 438/48, 49, 438/54, 57, 69, 91, 380; 710/105, 30, 310, 710/305
See application file for complete search history.

(56) References Cited

U.S. PATENT DOCUMENTS

| | | | | | |
|---|---|---|---|---|---|
| 5,263,027 | A | * | 11/1993 | Sakaguchi | 370/503 |
| 5,369,640 | A | * | 11/1994 | Watson et al. | 714/700 |
| 5,640,422 | A | * | 6/1997 | Johnson | 375/259 |
| 5,708,967 | A | * | 1/1998 | Clarke | 455/522 |
| 5,712,883 | A | * | 1/1998 | Miller et al. | 375/371 |
| 5,930,525 | A | * | 7/1999 | Gotesman et al. | 710/30 |
| 6,018,782 | A | * | 1/2000 | Hartmann | 710/310 |
| 6,035,364 | A | * | 3/2000 | Lambrecht et al. | 710/305 |
| 6,081,148 | A | * | 6/2000 | Song | 327/292 |
| 6,275,975 | B1 | * | 8/2001 | Lambrecht et al. | 716/14 |
| 6,279,142 | B1 | | 8/2001 | Bowen et al. | |
| 6,415,344 | B1 | * | 7/2002 | Jones et al. | 710/105 |
| 6,426,656 | B1 | * | 7/2002 | Dally et al. | 327/51 |
| 6,587,815 | B1 | * | 7/2003 | Aingaran et al. | 703/13 |
| 6,606,360 | B1 | * | 8/2003 | Dunning et al. | 375/354 |
| 6,630,904 | B1 | * | 10/2003 | Gustafson et al. | 342/357.06 |
| 2002/0161959 | A1 | | 10/2002 | Apostol, Jr. et al. | |
| 2002/0175390 | A1 | | 11/2002 | Craft | |
| 2003/0101170 | A1 | * | 5/2003 | Edelstein et al. | 707/3 |

OTHER PUBLICATIONS

International Business Machines Corporation, "Hybrid Transistional Coding of Wide On-Chip Busses", Research Disclosure, Nov. 2001, pp. 1958-1959.

(Continued)

*Primary Examiner*—Douglas W Owens
(74) *Attorney, Agent, or Firm*—Gibb I.P. Law Firm, LLC; Richard A. Henkler, Esq.

(57) ABSTRACT

The invention transmits data on an integrated circuit chip by first propagating a first data portion along a first segment of a segmented data line and then propagating the first data portion along a second segment of the segmented data line and simultaneously propagating a second data portion along the first segment of the segmented data line. The invention breaks a single data transmission into such different data portions and later reassembles the different data portions back into the single data transmission after all of the different data portions have been individually transmitted along all portions of the segmented data line

27 Claims, 5 Drawing Sheets

OTHER PUBLICATIONS

Nalamalpu et al., "Boosters For Driving Long Onchip Interconnects—Design Issues, Interconnect Synthesis, and Comparison with Repeaters", IEEE Xplore, vol. 21, No. 1, Jan. 2002, pp. 50-62.

Yamada et al., "A Novel Approach to Realizing Flexible Transport Systems Using Reconfigurable Hardware", IEEE, vol. 1, Nov. 1995, pp. 67-71.

* cited by examiner

CIRCUIT AND METHOD FOR PIPELINED INSERTION

BACKGROUND OF INVENTION

1. Field of the Invention

The present invention generally relates to transmitting data across integrated circuit chip structures and more particularly to a novel structure and method for transmitting data across integrated circuit chip structures that substantially increases the utilization of existing data transmission lines by simultaneously transmitting (e.g., pipelining) different data portions along different segments of a single data transmission line.

2. Description of the Related Art

As the size of devices within integrated circuit chips decreases and the clock speed increases, the ability to transmit data from one portion of the chip to another portion becomes increasingly difficult. In essence, because the device sizes are decreasing and the clock speed is increasing, the data transmission lines are actually becoming relatively longer even if they actually stay the same size because their environment continues to decrease our around them. In other words, a previous data transmission line might have spanned 10,000 devices while the same size data transmission line may now span 100,000 devices.

Some chips utilize buffers to repower the signal as data is transmitted across the chip; however, at some point, as the number of buffers is increased, the time required to transmit a signal decreases unacceptably. Therefore, rebuffering transmitted signals reaches a point of diminishing returns and, in some situations, cannot accommodate for decreases in device size and clock speed increases.

The integrated circuit designer must balance clock trees so as to allow for the maximum time for data transmissions across the chip. Whatever skew exists must ultimately come out of the clock cycle time, which slows down the clock. In addition, the power consumed by clock trees is a significant part of the overall power consumption of the chip. The invention described below addresses these issues by presenting a novel structure and method for transmitting data across integrated circuit chip structures that substantially increases the utilization of existing data transmission lines by simultaneously transmitting different data portions along different segments of a single data transmission line.

SUMMARY OF INVENTION

The invention transmits data on an integrated circuit chip by first propagating a first data portion along a first segment of a segmented data line and then propagating the first data portion along a second segment of the segmented data line and simultaneously propagating a second data portion along the first segment of the segmented data line. The invention breaks a single data transmission into such different data portions and later reassembles the different data portions back into the single data transmission after all of the different data portions have been individually transmitted along all portions of the segmented data line.

Thus, the invention simultaneously propagates different data portions along segments of the segmented data line, such that the second segment of the segmented data line carries the first data portion at the same time the first segment of the segmented data line simultaneously carries the second data portion.

More specifically, the invention provides an integrated circuit chip that has a segmented data line and data propagators positioned between segments of the segmented data line. Each data propagator simultaneously propagates different data portions along different segments of the segmented data line. An initiator (transmitter) at one end of the segmented data line breaks up a single data transmission into the different data portions and a collector (receiver) at the other end of the segmented data line combines the different data portions back into the original single data transmission after all of the different data portions have been individually transmitted along all portions of the segmented data line.

The different data portions comprise self-timed data portions free of the system clock. Thus, the data propagator, and the data receiver are synchronized with each other as opposed to being synchronized with a system clock. The data transmitter and the data propagator are adapted to transmit one of the self-timed data portions along each of the segments of the segmented data line at a time, such that each of the segments of the segmented data line simultaneously transmits a different self-timed data portion.

The segmented data line can be a single data communication line between a single data source and a single data target or a data communication network between at least one data source and multiple data targets. The data propagators (and the collector) are adapted to return a data receipt acknowledgment to a previous data propagator (and to the initiator) as each of the data propagators forward data to the next data propagator.

When compared to conventional data transmission systems, the invention provides the same latency yet substantially increases throughput (for a given size transmission line). For example, where a conventional transmission line would take a certain number of clock cycles (e.g., ten clock cycles) to transmit a single portion (e.g., one byte) of data, the invention would also take the same number of clock cycles to transmit the same amount of data. Therefore, the invention has the same latency as the conventional transmission line. However, the invention provides substantially increased throughput. The conventional system can only send one portion of data along the entire data transmission line at one time. To the contrary, because the invention simultaneously transmits different portions of data along different segments of the data transmission line, with the invention, a new portion of data could be sent every other clock cycle (e.g., as soon as the acknowledgment is received from the next propagator in line). Therefore, by dramatically increasing throughput, the invention reduces the number of clock cycles required to transfer the same amount of data over the same size (and same length) data transmission line.

BRIEF DESCRIPTION OF DRAWINGS

The invention will be better understood from the following detailed description with reference to the drawings, in which.

DETAILED DESCRIPTION

As mentioned above, the invention addresses conventional data transmission issues by presenting a novel structure and method for transmitting data across integrated circuit chip structures that substantially increases the utilization of existing data transmission lines by simultaneously transmitting different data portions along different segments of a single data transmission line. The present invention uses storage elements to enable simultaneous multiple signal propagation. The approach taken by the invention breaks up the cross chip communication into shorter self-timed elements that can utilize a self-timed request and acknowledgement handshake to break up the total distance that must be traversed before an acknowledgement response returns, which substantially reduces the total time a piece of information stays on a given wire segment.

Figure 1:
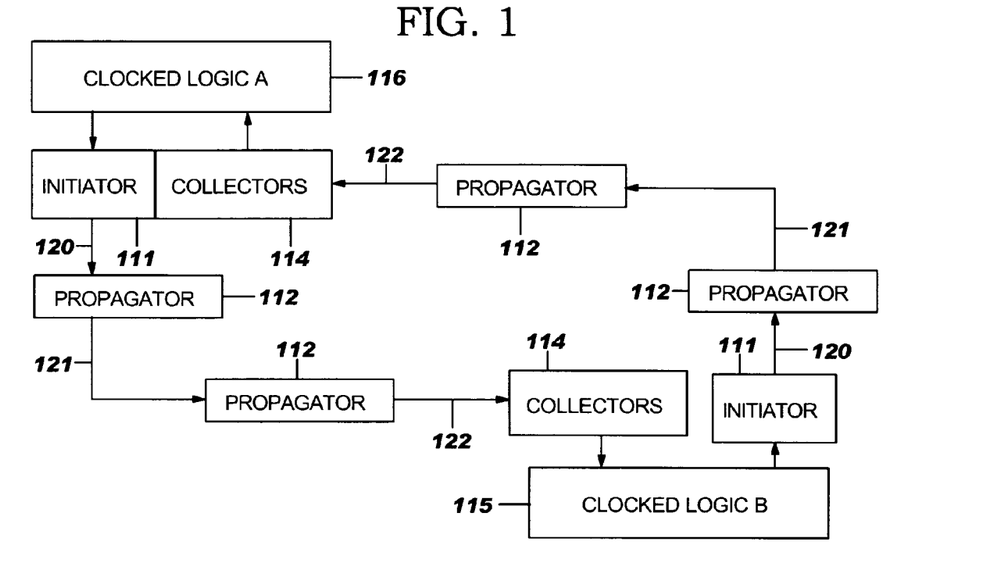
FIG. 1 is a schematic diagram of a data transmission system according to the invention.

More specifically, referring to FIG. 1, the invention transmits data on an integrated circuit chip by first propagating a first data portion along a first segment 120 of a segmented data line 120–122 and then propagating the first data portion along a second segment 121 of the segmented data line and simultaneously propagating a second data portion along the first segment 120 of the segmented data line. The invention breaks a single data transmission into such different data portions and later reassembles the different data portions back into the single data transmission after all of the different data portions have been individually transmitted along all portions of the segmented data line. Thus, the invention simultaneously propagates different data portions along segments of the segmented data line, such that the second segment 121 of the segmented data line carries the first data portion and the first segment 120 of the segmented data line simultaneously carries the second data portion.

More specifically, the invention provides an integrated circuit chip that has one or more segmented data lines 120–122 and data propagators 112 positioned between segments of the segmented data line. Each data propagator 112 simultaneously propagates different data portions along different segments of the segmented data line. An initiator (transmitter) 111 at one end of the segmented data line breaks up a single data transmission into the different data portions and a collector (receiver) 114 at the other end of the segmented data line combines the different data portions back into the original single data transmission after all of the different data portions have been individually transmitted along all portions of the segmented data line. The data sources and targets are shown as clocked logic A 116 and clocked logic B 115, which can operate at the same or different clock rates.

The different data portions comprise self-timed data portions free of the system clock. Thus, the data propagator, and the data receiver are synchronized with each other as opposed to being synchronized with any of the system clocks (115, 116). The data transmitter and the data propagator are adapted to transmit one of the self-timed data portions along each of the segments of the segmented data line at a time, such that each of the segments of the segmented data line simultaneously transmits a different self-timed data portion.

Figure 2:
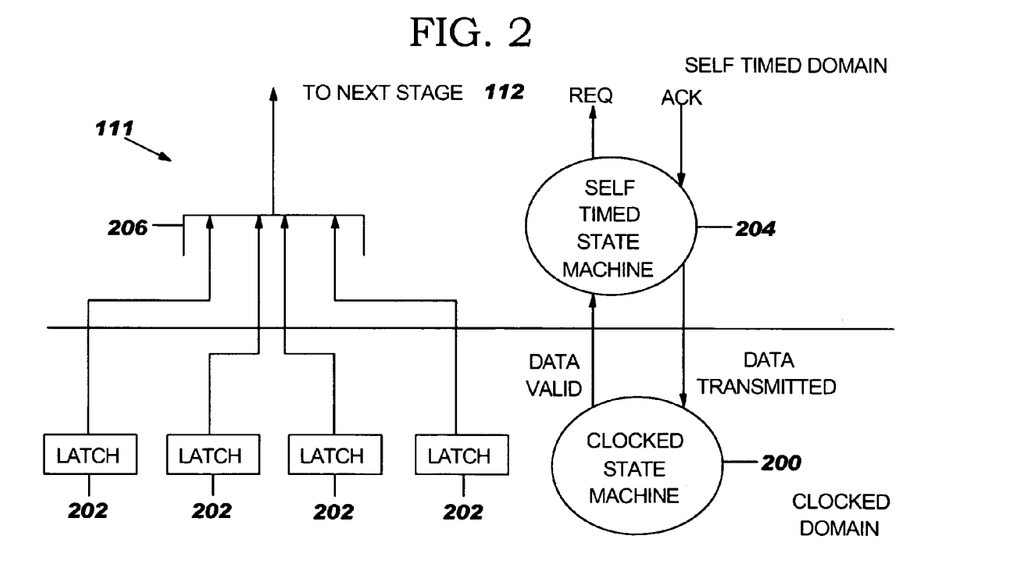
FIG. 2 is a schematic diagram of the interface between an initiator and a propagator shown in FIG. 1.

More specifically, FIG. 2 illustrates the interaction between the initiator 111 (which has a clocked domain portion and a self-timed domain portion) and one of the propagators 112 (which is in a self-timed domain). The communication takes place with the initiator 111 dividing a single data transmission into a number of data portions. Each of the data portions is stored in one of many latches 202 in the initiator 111. The size of the latches 202 is preferably matched to the width of the transmission line such that all data within an individual latch can be simultaneously transmitted along the segmented-data line 120–122. The initiator utilizes the clock state machine 200 to insure that the data being transferred is valid, as shown in greater detail with respect to FIG. 4 (discussed below). A self-timed state machine 204 within the initiator 111 controls a multiplexor 206 to select data from one of the latches 202 that is to be passed to the next adjacent down stream propagator 112. The self timed state machine makes the request to the next subsequent propagator 112 and receives an acknowledgement from the propagator 112 once the propagator receives and validates the data. Once the acknowledgement is received, the multiplexor 206 selects data from a different latch 202 and transmits the same to the adjacent downstream propagator 112. Therefore, the invention decreases signal transmission time because the acknowledgement is received much faster as it comes from a propagator that is positioned closer to the data source than the data target.

In turn, each propagator 112 communicates with the next down stream propagator until the data reaches the collector. The data propagators are adapted to return a data receipt acknowledgment to a previous data propagator (and to the initiator) as each of the data propagators forward data to the next data propagator. Therefore, the propagators 112 act together to allow each different segment of the segmented data line 120–122 to simultaneously carry a different portion of the data.

Figure 3:
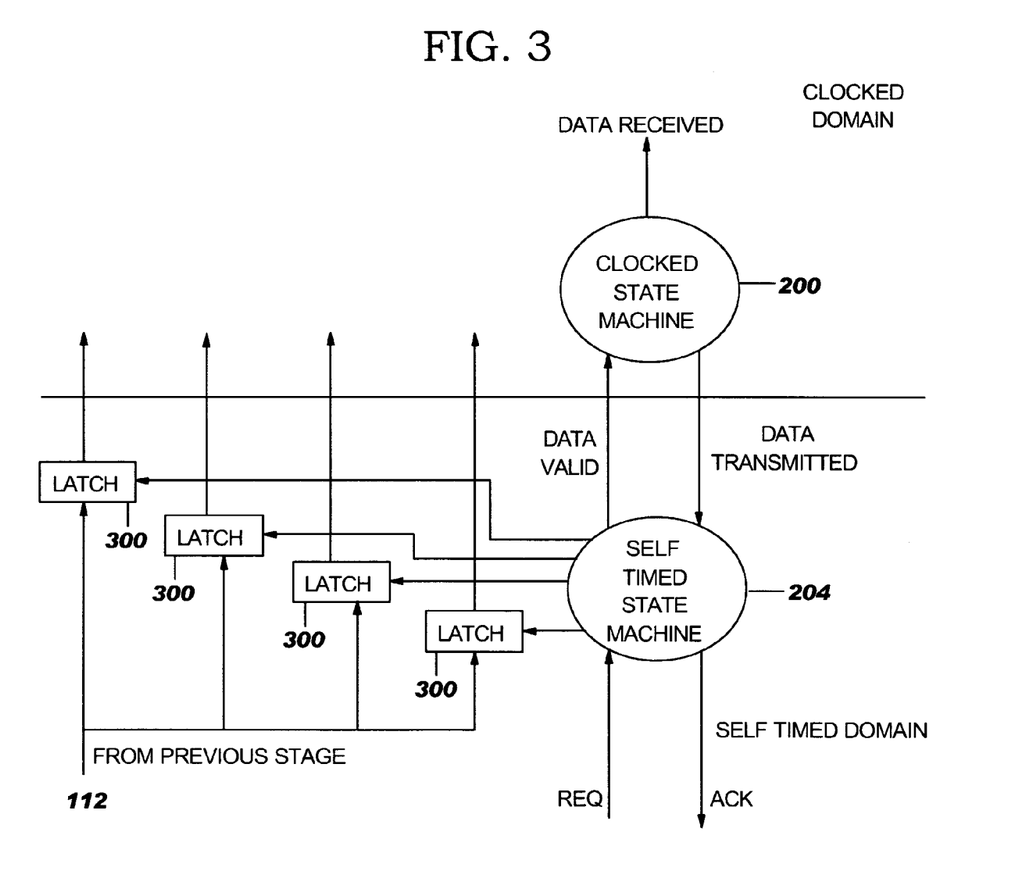
FIG. 3 is a schematic diagram of the interface between an initiator and a collector shown in FIG. 1.

FIG. 3 illustrates how the collector 114 reassembles the portions of data back to the same width that it was presented to the initiator 111. In other words, the collector 114 combines the different data portions back into the original single data transmission after all of the different data portions have been individually transmitted along all portions of the segmented data line. As each portion of the data is received, it is stored in a separate latch 300 within the collector 114. The same type of self-timed state machine 204 and clock state machine 200 are utilized by the collector 114 in order to take the transmitted data from the self-timed domain back into the clock domain (although this clock domain may be operating at a different frequency than the previous clock domain).

Figure 4:
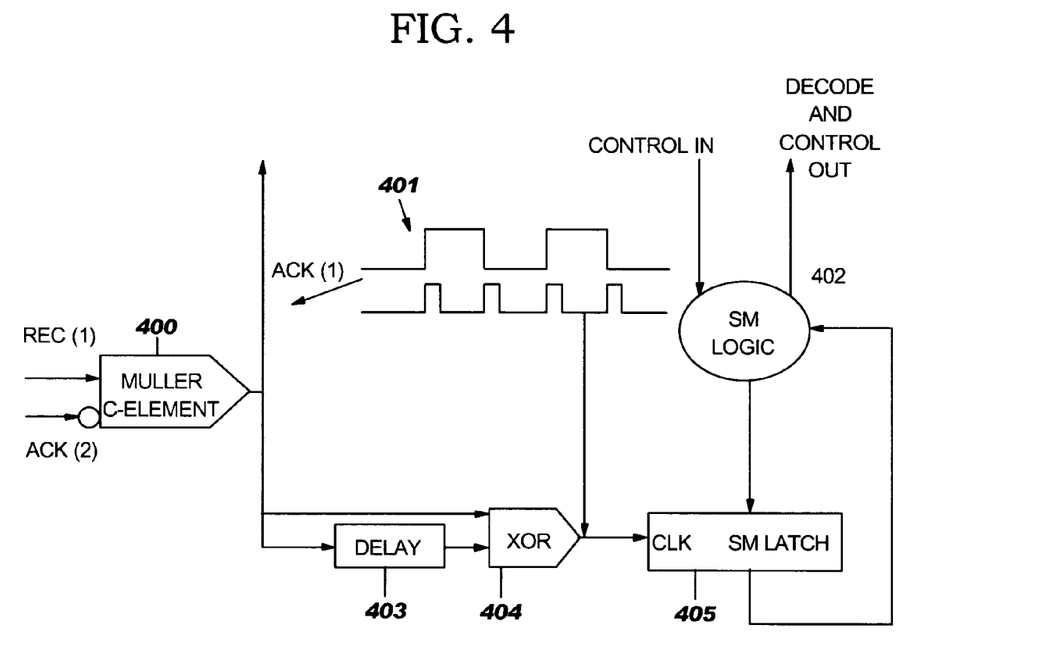
FIG. 4 is a schematic diagram of an inventive structure that allows the state machine shown in FIGS. 2 and 3 to properly advance.

The structure shown in FIG. 4 allows the self-timed state machine 204 to advance and control appropriately. As can be seen in FIG. 4 a Mueller C-element 400 has Request (Rec 1) and Ack (Ack 2) inputs and an Ack 1 output. According to the operation of the Mueller C-element 400, if Rec 1 and Ack 2 are different there is an outstanding request, and if they are the same the data has been captured in the latches of this stage and the Ack 1 is sent out. Any edge on the Ack 1 (as determined by the delay 403 comparison performed in the XOR device 404) represents a change of state, and as such, is used to signal a change in the state machine. To generate this pulse Ack 1 is sent through an edge detect circuit (the delay 403 and the exclusive OR gate 404) thus creating a pulse at every edge. This pulse is what clocks the latch of the state machine in item 405 that is used to advance and control in the state machine logic 402.

Figure 5:
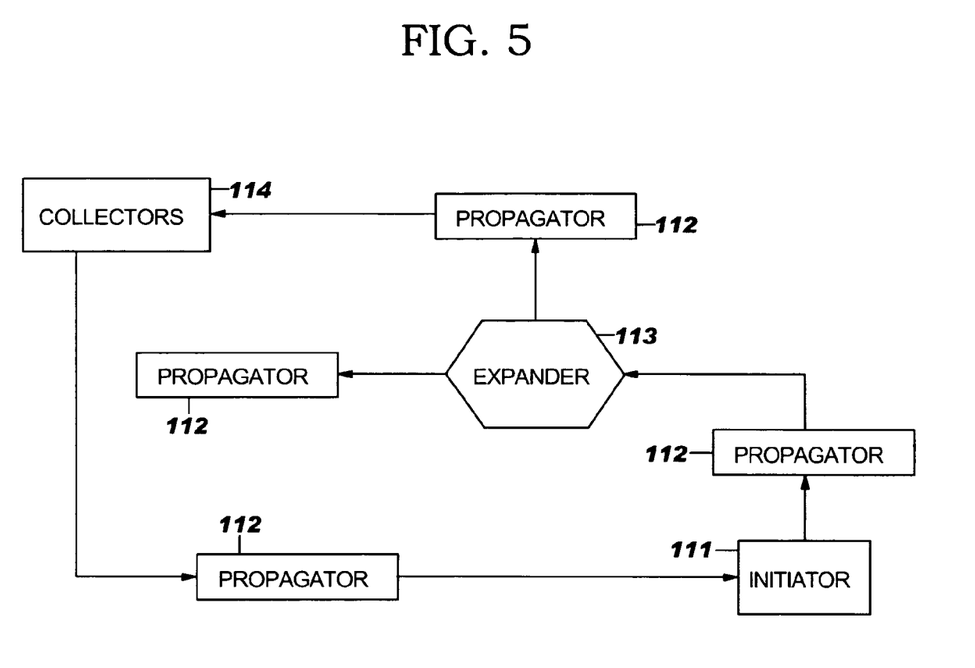
FIG. 5 is a schematic diagram of a data transmission system according to the invention.

The segmented data line can be a single data communication line between a single data source and a single data target or a data communication network between at least one data source and multiple data targets as shown in FIG. 5. More specifically, FIG. 5 illustrates an expander 113 that can be utilized to propagate the data along multiple segmented data paths. The expander 113 has the ability to receive the N sets of receiving signals and perform the arbitration, and if there are no conflicts, route them onto the forward path. If a conflict exists, N sets of received signals will require a buffer/time delay element, until the first set has cleared the transmit stage. Once the first set clears the transmit stage, then the next set of time buffered receiving signal will be routed through until all N sets of receiving signals have cleared the expander. Thus, FIG. 5 illustrates an asynchronous transmit/receive device that allows for multiple destinations.

Figure 6:
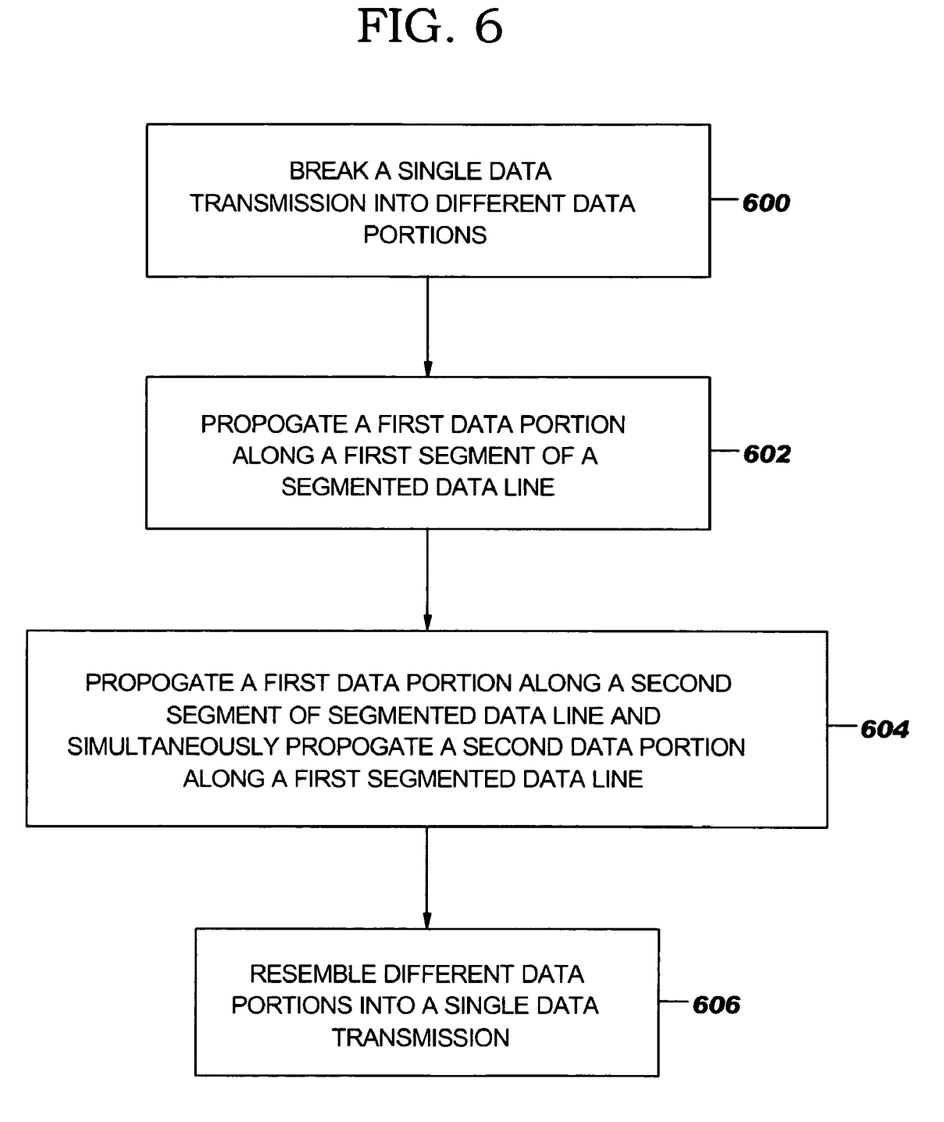
FIG. 6 is a flow diagram illustrating a preferred method of the invention.

FIG. 6 illustrates a flow diagram of the invention. In item 600, the invention breaks a single data transmission into different data portions. Next, in item 602, the invention propagates a first data portion along a first segment of a segmented data line. In item 604, the invention propagates the first data portion along a second segment of the segmented data line and the second data portion along the first segment. In item 606, the invention reassembles different data portions into the single data transmission after all of the different data portions have been individually transmitted along all portions of the segmented data line.

When compared to conventional data transmission systems, the invention provides the same latency yet substantially increases throughput (for a given size transmission lines). For example, a conventional one byte transmission line may include four buffers in order to overcome excessive resistance-capacitance (RC) effects. These buffers would divide the transmission line into five portions. In this example it is presumed to take five clock cycles to transmit a single byte of data from one end of the transmission line (data source) to the other end of the transmission line (data target) because each buffer is presumed to consume one additional clock cycle. After the data is received, an acknowledgement signal would take an additional five clock cycles to be returned back to the beginning of the transmission line. Thus, it would take ten clock cycles to transmit a single byte of data along such a conventional data transmission line. Therefore, it would take 50 clock cycles to transmit five bytes of data along the same conventional transmission line.

To the contrary, with the invention, a similar one byte transmission line would be divided into five segments using four propagators. In this example, the propagator is would be located at the same positions the buffers were located in the conventional data transmission line discussed above. One clock cycle would be required to send the first byte of data from one of the one byte buffers in the initiator to the first propagator and another clock cycle would be required to send the acknowledgement from the first propagator back to the initiator. On the third clock cycle, the initiator would transmit a second byte of data from a different one byte buffer along the first segment of the data transmission line while the first propagator was simultaneously sending the first portion of data to the next propagator (e.g., second propagator in line). On the fourth cycle, the second propagator would send an acknowledgement to the first propagator and the first propagator would simultaneously send an acknowledgement to the initiator. With the invention, this process will be repeated until all five bytes of data are transmitted. With the invention, a new byte of data could be sent every other clock cycle (e.g., as soon as the acknowledgments is received from the next propagator in line).

Thus, with the inventive data transmission line, the first byte of data would be transmitted in ten clock cycles and, therefore, the invention has the same latency as the conventional transmission line discussed above. However, at the eleventh clock cycle, the inventive data transmission line is transmitting the fifth byte of data along the first segment of the data transmission line (while the conventional system would only be beginning the transmission of the second byte of data at the eleventh clock cycle). The fifth byte of data in the inventive data transmission line would similarly require ten clock cycles to complete its journey from the beginning of the transmission line to the end of the transmission line. Therefore, in the invention, all five bytes would be transmitted in 21 clock cycles which is substantially shorter than the 50 clock cycles required with the conventional system. Therefore, by dramatically increasing throughput, the invention reduces the number of clock cycles required to transfer the same amount of data over the same size (and same length) data transmission line.

While the invention has been described in terms of preferred embodiments, those skilled in the art will recognize that the invention can be practiced with modification within the spirit and scope of the appended claims.

The invention claimed is:

1. An integrated circuit chip comprising:
    a segmented data line; and
    data propagators positioned between segments of said segmented data line,
    wherein said data propagators are adapted to simultaneously propagate different data portions along segments of said segmented data line, such that a first segment of said segmented data line carries a first data portion and a second segment of said segmented data line simultaneously carries a second data portion.

2. The integrated circuit chip in claim 1, further comprising a collector connected to said segmented data line, wherein said collector is adapted to combined said different data portions into a single data transmission.

3. The integrated circuit chip in claim 2, further comprising an initiator adapted to break up said single data transmission into said different data portions.

4. The integrated circuit chip in claim 2, wherein said different data portions comprise self-timed data portions.

5. The integrated circuit chip in claim 1, wherein said segmented data line comprises a single data communication line between a singe data source and a single data target.

6. The integrated circuit chip in claim 1, wherein said segmented data line comprises a data communication network between at least one data source and multiple data targets.

7. The integrated circuit chip in claim 1, wherein said data propagators are adapted to return a data receipt acknowledgment to a previous data propagator as each of said data propagators forward data to the next data propagator.

8. An integrated circuit chip comprising:
    a data source;
    a data target;
    a segmented data line between said data source and said data target;
    a data transmitter connected to said data source and to a first segment of said segmented data line, wherein said data transmitter is adapted to prepared data from said data source for transmission along said segmented data line;
    at least one data propagator connected to said first segment of said segmented data line and to a second segment of said segmented data line, wherein said data propagator is adapted to send a data receipt acknowledgement to said data transmitter and to propagate said data along said second segment of said segmented data line, such that said first segment of said segmented data line carries a first data portion and said second segment of said segmented data line simultaneously carries a second data portion; and a data receiver connected to said second segment of said segmented data line and to said data target, wherein said data receiver is adapted to prepare data from said second segment of said segmented data for receipt by said data target.

9. The integrated circuit chip in claim 8, wherein said data transmitter, said data propagator, and said data receiver are synchronized with each other.

10. The integrated circuit chip in claim 8, wherein said data transmitter is adapted to break up a data segment received from said data source into a plurality of smaller self-timed data portions.

11. The integrated circuit chip in claim 10, wherein said data transmitter and said data propagator are adapted to transmit one of said self-timed data portions along each of said segments of said segmented data line at a time, such that each of said segments of said segmented data line simultaneously transmits a different self-timed data portion.

12. The integrated circuit chip in claim 10, wherein said data receiver it is adapted to reassemble said self-timed data portions back into said data segment.

13. The integrated circuit chip in claim 8, wherein said data source and said data target are located on a single integrated circuit chip.

14. An integrated circuit chip comprising:
a data source;
a data target;
a segmented data line between said data source and said data target;
a data transmitter connected to said data source and to a first segment of said segmented data line;
at least one data propagator connected to said first segment of said segmented data line and to a second segment of said segmented data line, wherein said data propagator is adapted to send a data receipt acknowledgement to said data transmitter and to propagate said data along said second segments of said segmented data line, such that said first segment of said segmented data line carries a first data portion and said second segment of said segmented data line simultaneously carries a second data portion; and
a data receiver connected to said second segment of said segmented data line and to said data target.

15. The integrated circuit chip in claim 14, wherein said data transmitter, said data propagator, and said data receiver are synchronized with each other.

16. The integrated circuit chip in claim 14, wherein said data transmitter is adapted to break up a data segment received from said data source into a plurality of smaller self-timed data portions.

17. The integrated circuit chip in claim 16, wherein said data transmitter and said data propagator are adapted to transmit one of said self-timed data portions along each of said segments of said segmented data line at a time, such that each of said segments of said segmented data line simultaneously transmits a different self-timed data portion.

18. The integrated circuit chip in claim 16, wherein said data receiver it is adapted to reassemble said self-timed data portions back into said data segment.

19. The integrated circuit chip in claim 14, wherein said data source and said data target are located on a single integrated circuit chip.

20. A method of transmitting data within an integrated circuit chip, said method comprising:
propagating a first data portion along a first segment of a segmented data line; and
propagating said first data portion along a second segment of said segmented data line and simultaneously propagating a second data portion along said first segment of said segmented data line.

21. The method in claim 20, further comprising breaking a single data transmission into different data portions, wherein said different data portions include said first data portion and said second data portion.

22. The method in claim 21, further comprising reassembling said different data portions into said single data transmission after all of said different data portions have been individually transmitted along all portions of said segmented data line.

23. The method in claim 20, wherein data propagators are positioned between each segment of said segmented data line, wherein said method further comprises returning a data receipt acknowledgment to a previous data propagator as each of said data propagators forward data to the next data propagator.

24. The method in claim 20, wherein said method simultaneously propagates different data portions along segments of said segmented data line, such that said second segment of said segmented data line carries said first data portion and said first segment of said segmented data line simultaneously carries said second data portion.

25. A method of transmitting data on an integrated circuit chip, said method comprising:
breaking a single data transmission into different data portions, wherein said different data portions include a first data portion and a second data portion;
propagating said first data portion along a first segment of a segmented data line; and
propagating said first data portion along a second segment of said segmented data line and simultaneously propagating said second data portion along said first segment of said segmented data line; and
reassembling said different data portions back into said single data transmission after all of said different data portions have been individually transmitted along all portions of said segmented data line.

26. The method in claim 25, wherein data propagators are positioned between each segments of said segmented data line, wherein said method further comprises returning a data receipt acknowledgment to a previous data propagator as each of said data propagators forward data to the next data propagator.

27. The method in claim 25, wherein said method simultaneously propagates different data portions along segments of said segmented data line, such that said second segment of said segmented data line carries said first data portion and said first segment of said segmented data line simultaneously carries said second data portion.

* * * * *